United States Patent
Daniels et al.

(10) Patent No.: US 7,359,738 B2
(45) Date of Patent: Apr. 15, 2008

(54) METHOD AND APPARATUS FOR ESTABLISHING AN AUDIO LINK TO A WIRELESS EARPIECE IN REDUCED TIME

(75) Inventors: Jared R. Daniels, Sunrise, FL (US); Sherry Easter Dubin, Coconut Creek, FL (US); Roberto Gautier, Davie, FL (US); James L. Howard, Davie, FL (US); Robert A. Marples, Coral Springs, FL (US); Matthew A. Stoll, Plantation, FL (US); Mayra Zayas, Pembroke Pines, FL (US); Jose E. Korneluk, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 83 days.

(21) Appl. No.: 11/135,988

(22) Filed: May 24, 2005

(65) Prior Publication Data

US 2006/0270464 A1 Nov. 30, 2006

(51) Int. Cl.
*H04M 1/00* (2006.01)
*H04M 9/00* (2006.01)
*H04B 1/38* (2006.01)

(52) U.S. Cl. ............ 455/569.1; 455/567; 455/575.2; 379/420.04; 379/428.02

(58) Field of Classification Search ............ 455/567, 455/569.1, 569.2, 575.2, 518, 521, 572, 574, 455/343.1, 343.2, 343.3, 343.4, 343.5, 343.6; 379/420.01, 420.02, 420.03, 420.04, 428.02
See application file for complete search history.

(56) References Cited

U.S. PATENT DOCUMENTS

| 5,448,620 | A | * | 9/1995 | Gershkovich et al. ... 455/552.1 |
|---|---|---|---|---|
| 5,953,674 | A | * | 9/1999 | Hutchison, IV ............ 455/557 |
| 7,155,264 | B2 | * | 12/2006 | Twitchell, Jr. ............. 455/574 |
| 2002/0115478 | A1 | * | 8/2002 | Fujisawa et al. ........... 455/567 |
| 2002/0198031 | A1 | * | 12/2002 | Holmes et al. ............. 455/569 |
| 2003/0119568 | A1 | * | 6/2003 | Menard ...................... 455/572 |
| 2003/0152056 | A1 | * | 8/2003 | Lee et al. ................... 370/338 |
| 2003/0186716 | A1 | * | 10/2003 | Dorenbosch et al. ....... 455/519 |
| 2004/0229658 | A1 | * | 11/2004 | Kim et al. ............... 455/569.1 |
| 2005/0020299 | A1 | * | 1/2005 | Malone et al. .......... 455/552.1 |
| 2005/0143145 | A1 | * | 6/2005 | Maekawa ................... 455/574 |
| 2005/0202844 | A1 | * | 9/2005 | Jabri et al. .............. 455/556.1 |
| 2006/0056332 | A1 | * | 3/2006 | Arase et al. ............... 370/328 |
| 2006/0217061 | A1 | * | 9/2006 | Steele et al. .............. 455/3.06 |

\* cited by examiner

*Primary Examiner*—Nay Maung
*Assistant Examiner*—Andrew Wendell
(74) *Attorney, Agent, or Firm*—Scott M. Garrett

(57) ABSTRACT

A mobile communication device (100) contains a local wireless controller (114) for operating with a remote audio processor (124). The remote audio processor is used for listening to and speaking with remote parties via the mobile communication device, and operates in a mode having a relatively long latency in communicating with the mobile communication device. Upon receiving a dispatch call (306), a baseband processor (108) of the mobile communication device notifies an application processor (110) with a high priority dispatch notification (122). The high priority dispatch notification causes an active link to be established between the mobile communication device and remote audio processor sooner than if were to occur with ordinary call processing.

15 Claims, 4 Drawing Sheets

METHOD AND APPARATUS FOR ESTABLISHING AN AUDIO LINK TO A WIRELESS EARPIECE IN REDUCED TIME

TECHNICAL FIELD

This invention relates in general to wireless communications, and more particularly to using remotely operated audio accessories via a wireless link with a mobile communication device for handling dispatch calls.

BACKGROUND OF THE INVENTION

Mobile communication devices are in widespread use throughout the world, and in particular in the metropolitan regions of the world. The cost of these devices and communication service has decreased so much over recent years that they are nearly as common as landline telephone communications. To remain competitive manufacturers have added functionality to their mobile communication device product to distinguish their products over those of other manufacturers.

One feature that has proven popular is the so called push to talk or dispatch mode of communications. In addition to conventional mobile telephony service, referred to as interconnect calling, these devices and systems support dispatch calling. Dispatch calling is a half duplex mode of calling resembling two way radio or walkie talkie operation. Furthermore dispatch calling is controlled by a push to talk operation where, when the party, for example, presses a push to talk button and begins speaking. Therefore the dispatch mode requires a low call set up latency so as to be as near instantaneous as possible. At the receiving device, as soon as an incoming dispatch call is received, unlike an interconnect call, the receiving device immediately unmutes a loudspeaker and begins playing the received audio information without any action on the part of the user of the receiving device.

A variety of accessories are available for mobile communication devices, and one particular type that has proven popular recently is a wireless earpiece. A wireless earpiece is worn on a user's ear, and connects to the mobile communication device via local wireless link, such as that known by the name Bluetooth. Since these accessories operate wirelessly with the mobile communication device, they must have their own power source, but because they are worn on the user's ear, they must also be small, so a large battery cannot be used. Consequently it is desirable to operate the earpiece in low power mode as much as possible. One way to achieve power saving operation is to have the earpiece go into a "sleep" mode and check periodically to see if the mobile communication device is transmitting anything to it. Such operation work fine with interconnect calling because in interconnect calling because, before any audio information is received, the user of the receiving device must first answer the call, which gives the mobile communication device time to wake up the earpiece to an active state. However, with dispatch calling, the latency in waking up the earpiece becomes critical, and a time acceptable for an interconnect call results in audio information being lost in a dispatch call. Therefore, there is a need to reduce the time it takes to wake up the earpiece from a low power state to an active state for handling dispatch calling. Piece

DETAILED DESCRIPTION

Figure 1:
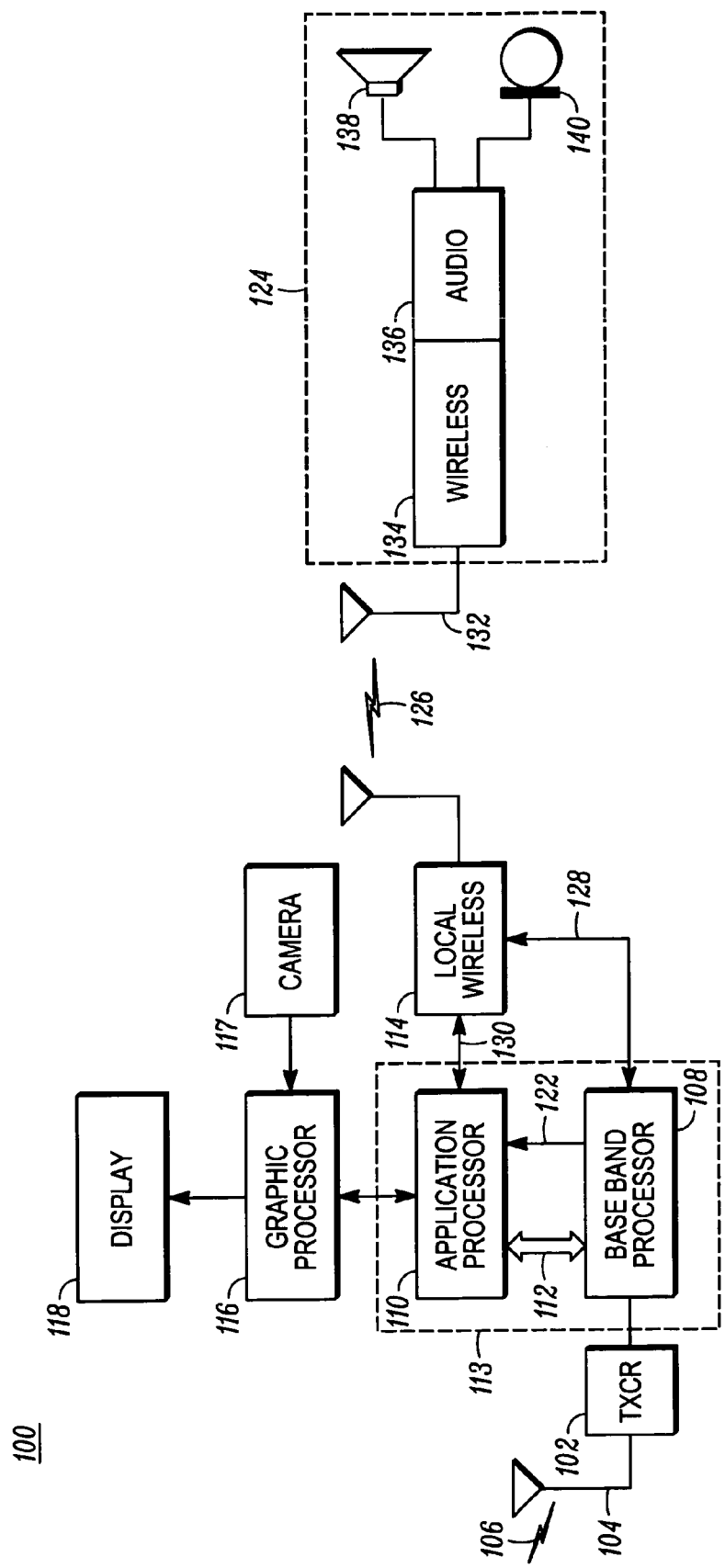
FIG. 1 shows a block schematic diagram of a mobile communication device, in accordance with an embodiment of the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of link establishment latency in bringing a remote audio processor, such as a wireless earpiece, out of a low power state to an active state upon receiving an incoming dispatch call by initiating an interrupt routine in the baseband processor of the mobile communication device. The interrupt causes the mobile communication device to initiate the active link with the remote audio processor. The interrupt may be serviced by an application processor of the mobile communication device.

Referring now to FIG. 1, there is shown a block schematic diagram of a mobile communication device 100, in accordance with an embodiment of the invention. The mobile communication device comprises a communications transceiver 102, which is coupled to an antenna 104 for receiving radio signals 106. The communications transceiver 102 performs the radio frequency operations for transmitting and receiving signals, as is known in the art, and is operably coupled to a baseband processor 108. The baseband processor 108 may control operation of the communications transceiver in accordance with an air interface, such as, for example, time division multiple access (CDMA), code division multiple access (CDMA), and so on. Generally the mobile communication device uses the communications transceiver to interface with a communications system which provides mobile communication service, although it is contemplated that the mobile communication device may interface directly with other mobile communication devices via a direct communication mode. The mobile communication device is capable of initiating and receiving conventional telephony interconnect calls as well as dispatch calls.

A dispatch call is a form of half duplex or simplex communication where, unlike an interconnect call, as soon as an incoming dispatch call is received the receiving mobile communication device unmutes an audio speaker and begins playing received audio data without any need for the user of the receiving mobile communication device to "answer" the dispatch call. Dispatch calling can be used for data as well as audio, and the primary benefit is the speed with which the transmitting party can commence transmitting to the receiving party since almost as soon as the initiating party commences a dispatch call a call circuit is established, unlike in interconnect calling where a switch must wait for the call to be accepted, and a full duplex circuit must be set up. Although the term 'dispatch calling' has in the past been associated with fleet radio, trunked radio, and other private radio systems, in recent years public networks such as those operated by Nextel, Inc. under the name Direct Connect in the United States are now more common and known. These systems are network-facilitated, meaning the dispatch call is routed through a fixed equipment network between the two parties. To handle network-facilitated dispatch calling, dedicated high speed network equipment is used to set up calls. Furthermore, a base station serving a dispatch call initiator may route the dispatch call request to different call processing equipment that it routes interconnect call requests. For example, it is now common for a communication system to be bifurcated, with one set of equipment for handling interconnect calling, such as a mobile switching center, and another set of equipment for handling dispatch calling, such as a dispatch application processor. In addition to network-facilitated dispatch calling it is contemplated that mobile communication devices may have the ability to communicate in a direct mode, and communicate directly without the use of a network.

While the baseband processor handles many of the low level functions of communication, and essentially acts as a modem for the mobile communication device, the application processor 110 handles the higher level functions, such as operation of a user interface, software environments such as JAVA, security, user applications such as phone and date book functions, interfacing with other subsystems. Other subsystems may include, for example, a local wireless network interface 114 for establishing a connection to local devices and accessories over a low power wireless link. The application processor and baseband processor are operably coupled, as indicated by arrow 112. In one embodiment of the invention the application processor and baseband processor are instantiated in software on a common hardware computing platform or chip, as indicated by the dashed line 113. In such an embodiment the coupling 112 is achieved in software using registers, variables, pointers, and other data structures for passing information between the layers. Alternatively, the baseband and application processors may be instantiated each on their own hardware computing platform, in which case the coupling 112 may be, for example, a serial link. The application processor, as mentioned, control higher level functionality of the mobile communication device, and may include controlling a graphics processor 116 for operating a camera module 117, a display 118, or both.

A remote audio processor 124 may be connected to the mobile communication device via the local wireless network interface 114 over a local wireless link 126. The remote audio processor may comprise an antenna means 132, a wireless transceiver and controller unit 134, an audio module 136, and audio transducers such as a speaker 138 and microphone 140. The audio module 136 drives the transducers 138, 140, and may convert analog signals to digital signals, and vice versa. The remote audio processor may be self contained, with its own power supply. One example of a remote audio processor is a wireless earpiece. Wireless earpieces are used in increasing frequency among users of mobile communication devices. The remote audio processor may also be, for example, a laptop or other personal computer, speakerphone, desktop phone set, and so on.

To conserve power when the remote audio processor is not processing audio information during a call, the mobile communication device and remote audio processor maintain a long latency link where the remote audio processor stays mostly in a low power mode and periodically or occasionally wakes up to check the air interface and see if the mobile communication device is transmitting to it. The long latency link may be an asynchronous link. When the mobile communication device needs to send audio data to the remote audio processor, it commands or otherwise causes the remote audio processor to wake up to an active mode, such as by using a synchronous link. The active mode is a low latency or no latency link so that the remote audio processor doesn't miss any of the audio information transmitted to in by the mobile communication device. For interconnect calls the baseband processor simply routes data between the air interface for the communications transceiver and the application processor, as a conventional modem. The application processor handles call set up, alerting the user to incoming calls, waiting for the user to answer the call, and so on. During that time the application processor has time to wake up the remote audio processor over the long latency link to the active mode to route audio information to the remote audio processor.

However, when the mobile communication device receives an incoming dispatch call, if the remote audio processor is transitioned to the active mode in the time frame acceptable for interconnect calls, some audio information will be lost due to the long latency. Accordingly, the invention provides an interrupt 122 which can be asserted by the baseband processor upon recognizing the incoming data pertains to an incoming dispatch call. Certain signaling is used to indicate the call type, and so a dispatch call is easily recognizable. When the call type for an incoming call indicates it is a dispatch call, the baseband processor notifies the application processor via a notification path 122. The notification path may be a communication link with low latency that is separate from the coupling link 112, so that high priority messages may be transmitted to the application processor. The notification link may also comprise an interrupt line with the notification signal simply being the assertion of an interrupt which prompts the application processor to service the interrupt with a servicing routine. In responding to the notification, the application processor is able to alert the remote audio processor to wake up and enter the active mode sooner that would occur with conventional call processing. It is further contemplated that the baseband processor may be directly coupled to the local wireless controller 114 via a link 128 which may be similar to an interrupt, and it may additionally be used to route audio information directly from the baseband processor to the local wireless controller, in accordance with one embodiment of the invention. The link 128 may be equivalent to the link 130 between the application processor and the local wireless controller 114, and may be an alternate to the link 130.

Figure 2:
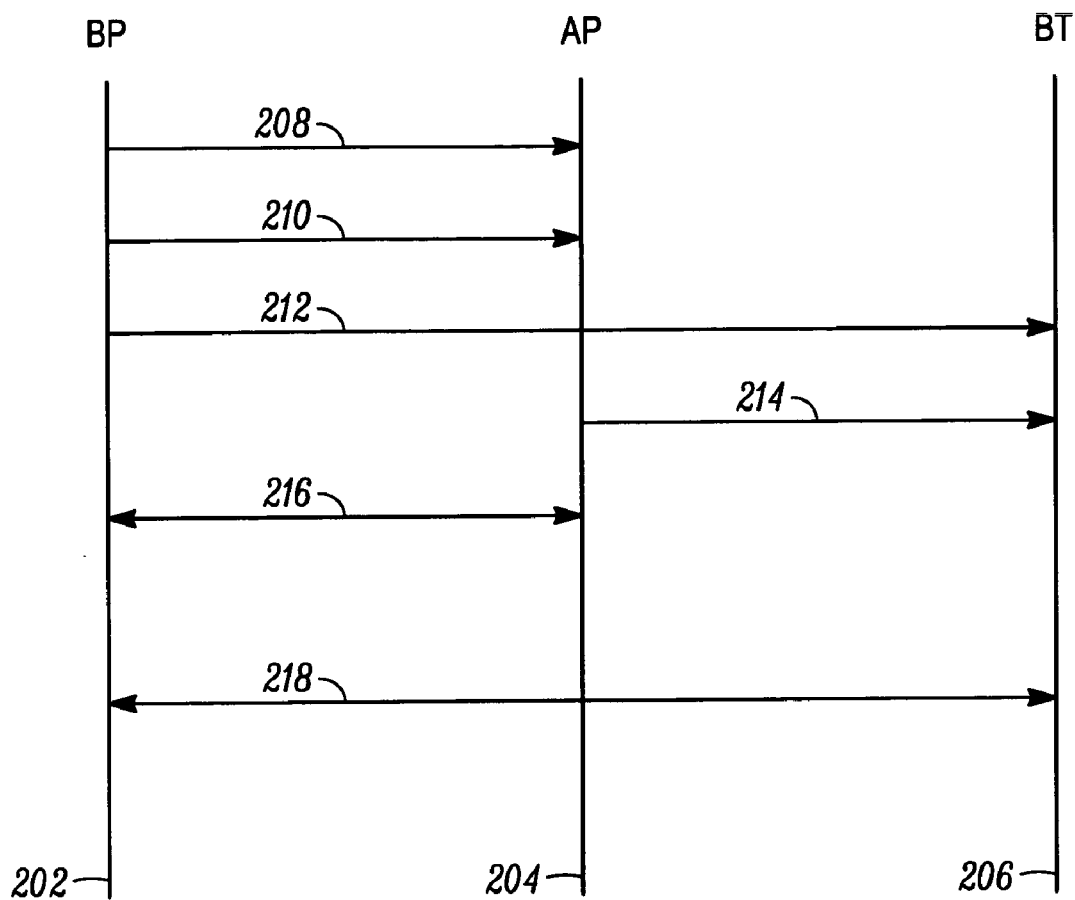
FIG. 2 shows a signal flow diagram, in accordance with an embodiment of the invention.

Referring now to FIG. 2, there is shown a signal flow diagram of a method of establishing an audio link with the remote audio processor in a reduced time, in accordance with an embodiment of the invention. The chart shows signaling between and among three entities of the mobile communication device, the baseband processor 202, application processor 204, and local wireless network controller 206. The local wireless network controller may operate the local wireless interface in accordance with well known local wireless networking standards, such as, for example, the Bluetooth standard, as described at http://www.bluetooth.org.

In accordance with the invention, when the baseband processor detects an incoming call, it notifies the application processor via a high priority notification 208. Alternatively, or in combination with the high priority notification, the baseband processor can notify the application processor 210 while also directly asserting a signal 212 to the local wireless network controller in case the application processor is operated in a low power or sleep mode. In response to 208, 210, the application processor sends an active mode link request 214 to the local wireless network controller, causing it to, in turn, signal to the remote audio processor to transition from a low power mode to the active mode. Call processing 216 occurs subsequent to the mobile communication device taking steps to wake up the remote audio processor, so that the audio information can quickly flow from the baseband processor to the local wireless network controller and then to the remote audio processor 218.

Figure 3:
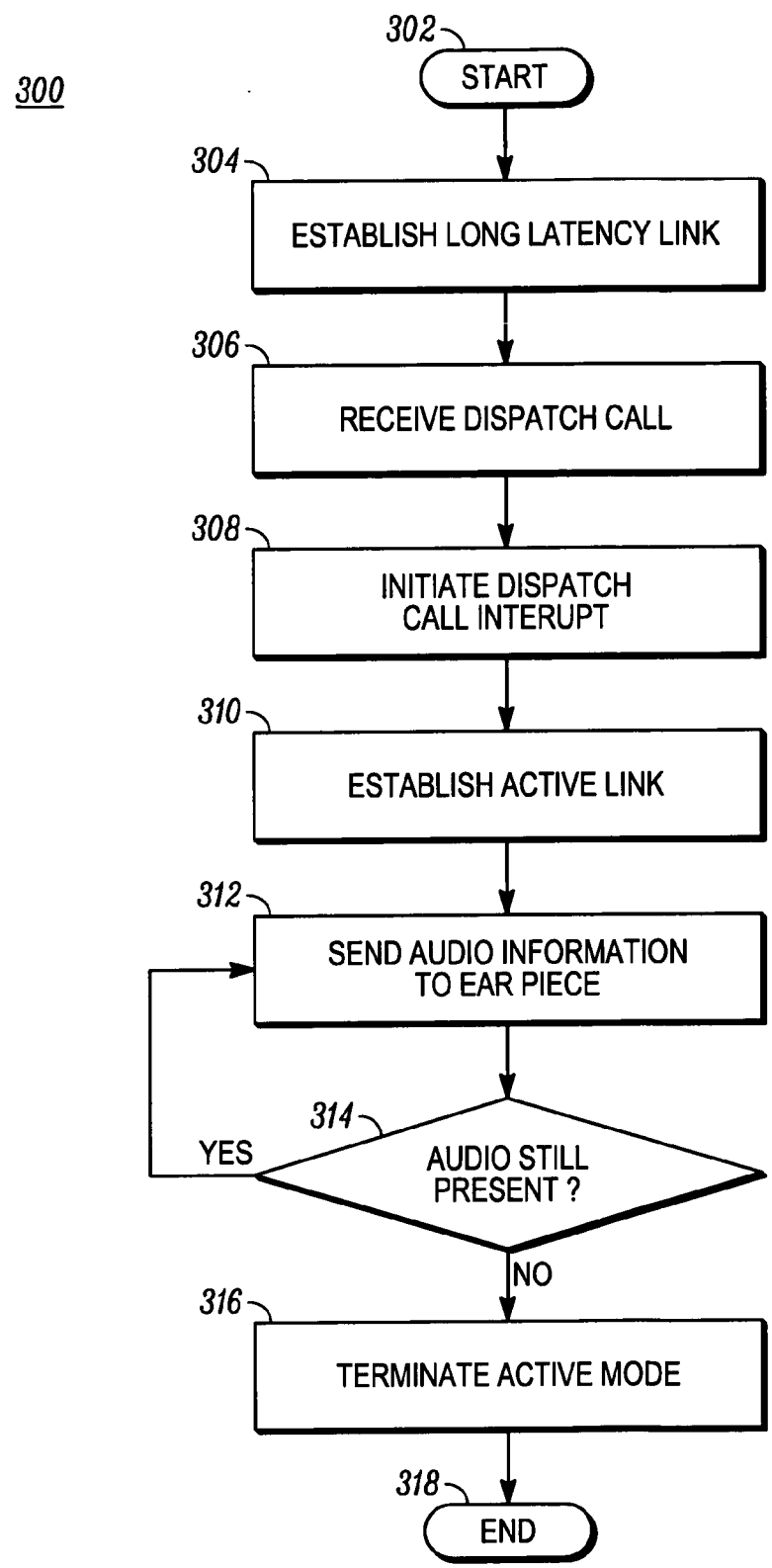
FIG. 3 shows a flow chart diagram of a method for establishing an audio link in reduced time, in accordance with an embodiment of the invention.

Referring now to FIG. 3, there is shown a flow chart diagram of a method of establishing an audio link in a reduced time 300, in accordance with an embodiment of the invention. At the start 302 of the method, the mobile communication device and remote audio processor are both powered on, but no call is in progress. The mobile communication device and remote audio processor establish a long latency link 304 over a local wireless interface, each of the mobile communication device and remote audio processor having radio and other circuitry and control code for operating the local wireless interface. The long latency link may be an asynchronous link, allowing the remote audio processor to enter a low power or sleep mode while no call is in progress. According to the invention, when an incoming dispatch call is detected 306, the baseband processor initiates a priority notification procedure to make the dispatch call reception known to the application processor, the local wireless controller, or both 308. The notification may take the form of a high priority message transmitted or delivered to the application processor from the baseband processor via a notification link separate from a normal communication link between the baseband and application processors. Alternatively, the notification may be in the form of, for example, the assertion of an interrupt. In response to the notification, an active link is initiated and established between the mobile communication device and the remote audio processor 310. The initiation of the active link occurs before call processing commences. The active link results in the remote audio processor transitioning from a low power mode to an active mode, and is a low latency link. In one embodiment of the invention the active link is a synchronous link. As call processing commences among the baseband and application processors, audio information is routed to the remote audio processor over the active link 312, as long as audio information is being received at the mobile communication device. Given the nature of dispatch calling, where the exchanges tend to be short, the call is taken down without any affirmative action by the user, unlike an interconnect call where the user may end a call by hanging up or pressing an 'on hook' button or equivalent, the remote audio processor may assume the call has been terminated after a preselected period of time, such as, for example, 10 seconds has passed and no further audio information has been received. When the remote audio processor has determined the call has terminated, the active link may be terminated 316, allowing the remote audio processor to transition back to a low power mode, ending the method 318 by maintaining communication with the mobile communication device over the long latency link.

Figure 4:
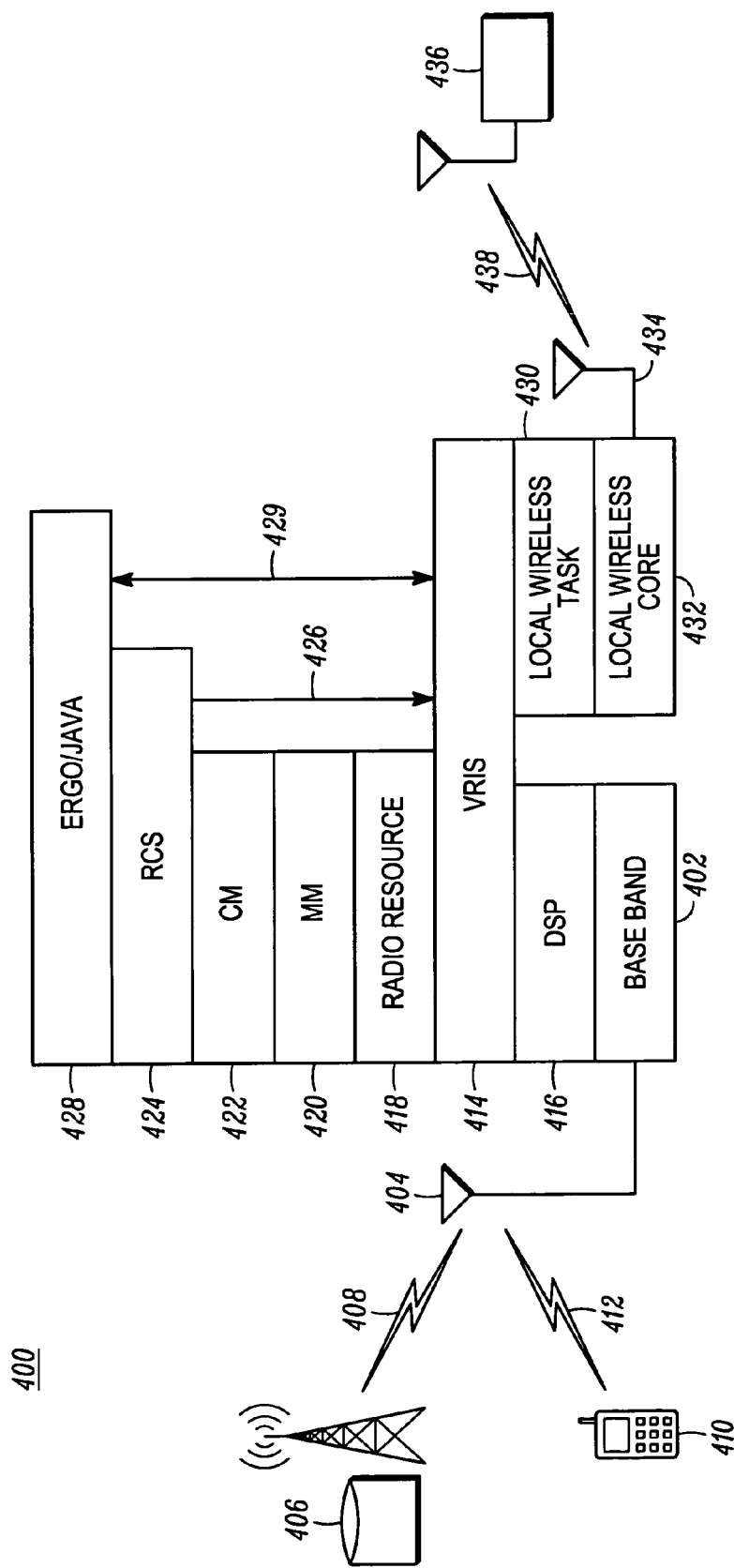
FIG. 4 shows a software architecture diagram of a mobile communication device, in accordance with an embodiment of the invention.

Referring now to FIG. 4, there is shown a software architecture diagram of a mobile communication device 400, in accordance with an embodiment of the invention. The baseband layer 402 communicates via the communications transceiver over an antenna 404 with a communication system base station 406 over an air interface 408, and it may communicate with other mobile communication devices 410 directly over a direct link 412. The baseband layer operates substantially as a modem layer. On top of the baseband layer is a digital signal processing layer 416 which processes data such as by encoding and decoding data for transmission and reception over the radio interfaces. A virtual radio interface software (VRIS) layer 414 represent a hardware abstraction layer for higher level layers. On top of the VRIS layer 414 is a stack comprised of a radio resource layer 418, mobility management layer 420, and a call management layer 422. The radio resource layer control operation of the radio resources in accordance with the appropriate protocol. Mobility management 420 controls mobility issues such as handovers, power control, and so on. The call management layer controls higher level call functions. For example, the call management layer may handle call management for circuit-switched services, such as interconnect calls, short message service (SMS) messaging, and circuit data calls such as voice over internet protocol (VoIP). On top of the call management layer is a radio communication services (RCS) layer 424 which is the interface between the call management layer and upper layers and passes, for example, user input to the lower layers. The highest layer is the ergonomics and JAVA layer 428. This layer operates the user interface and multimedia aspects of the mobile communication device, as well as execution and application operating environments.

The layers including the RCS layer 424 and below are part of the baseband processor, while the ergonomics layer 428 is part of the application processor. When the baseband processor detects an incoming dispatch call, according to one embodiment of the invention, notification of the dispatch call is passed form the RCS layer 424 to the VRIS layer 414, which also sits on top of the local wireless task layer 430. The local wireless task layer is a protocol stack that controls operation of a local wireless hardware core layer 432 in accordance with a local wireless network protocol, such as, for example, the Bluetooth protocol. The local wireless core layer includes an antenna 434 with which to maintain wireless links 438 to local wireless devices, including the remote audio processor 436.

Therefore, one embodiment of the invention provides a method for establishing a wireless audio link between a mobile communication device and a remote audio processor by first establishing an asynchronous link between the remote audio processor and the mobile communication device. The method the commences upon receiving an incoming dispatch call at the mobile communication device, which includes audio information, by notifying the application processor of the mobile communication device with a high priority dispatch notification. The high priority dispatch notification may be a message transmitted to the application processor on a dedicated high priority link, or, for example, it may be an interrupt asserted on an interrupt line of the application processor which the application processor services. The high priority dispatch notification is generated by the baseband processor. When the application processor receives the high priority dispatch notification, it commences servicing the high priority dispatch notification by initiating a synchronous link with the remote audio processor via the local wireless network controller. As audio information is subsequently received at the application processor, it commences transmitting the audio information from the mobile communication device to the remote audio processor over the synchronous link. The incoming dispatch call may be received from communication network via a base station of a communication system, or directly from another mobile communication device. Establishing the asynchronous link and initiating the synchronous link between the mobile communication device and the remote audio processor may be performed using a Bluetooth wireless interface. It is further contemplated that after a predetermined period of time during which no audio information is received, the active link may be destablished. The application processor and baseband processor may each be instantiated on a common hardware computing platform, or on separate hardware computing platforms.

The invention further provides a mobile communication device having a communications transceiver, a baseband processor operably coupled to the communications transceiver, an application processor operably coupled to the baseband processor, and a local wireless network transceiver operably coupled to either the baseband processor and the application processor, or both. The local wireless transceiver is used to, among other activities, communicate with a remote audio processor via a wireless asynchronous link while operating in a first or low power mode. However, upon receiving a dispatch call via the communications transceiver, the baseband processor initiates a high priority dispatch notification to the application processor for causing the local wireless network transceiver to commence establishing a synchronous link with the remote audio processor over which audio information is transmitted from the mobile communication device to the remote audio processor.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for establishing a wireless audio link between a mobile communication device and an associated remote audio processor, comprising:
   establishing a wireless asynchronous link between the remote audio processor and the mobile communication device, wherein the remote audio processor operates in a low power mode;
   receiving an incoming dispatch call at the mobile communication device, including audio information;
   in response to receiving the incoming dispatch call, notifying the application processor of the mobile communication device with a high priority dispatch notification, performed by a baseband processor of the mobile communication device;
   servicing the high priority dispatch notification at the application processor by initiating a wireless synchronous link with the remote audio processor causing the remote audio processor to transition to an active mode;
   transmitting the audio information from the mobile communication device to the remote audio processor over the wireless synchronous link.

2. A method for establishing a wireless audio link as defined in claim 1, wherein receiving the incoming dispatch call comprises receiving the incoming dispatch call from a base station of a communication system.

3. A method for establishing a wireless audio link as defined in claim 1, wherein receiving the incoming dispatch call comprises receiving the incoming dispatch call from another mobile communication device over a direct communication channel.

4. A method for establishing a wireless audio link as defined in claim 1, wherein establishing the wireless asynchronous link and initiating the wireless synchronous link between the mobile communication device and the remote audio processor are performed using a Bluetooth wireless interface.

5. A method for establishing a wireless audio link as defined in claim 1, further comprising terminating the wireless synchronous link after a predetermined period of time during which no audio information is received.

6. A method for establishing a wireless audio link as defined in claim 1, wherein the application processor and baseband processor are each instantiated on a common hardware computing platform.

7. A method for establishing a wireless audio link as defined in claim 1, wherein the application processor and baseband processor are each instantiated on a different hardware computing platforms.

8. A mobile communication device, comprising:
   a communications transceiver;
   a baseband processor operably coupled to the communications transceiver;
   an application processor operably coupled to the baseband processor; and
   a local wireless network transceiver operably coupled to one of the baseband processor and the application processor, and in communication with a remote audio processor via a wireless asynchronous link, the wireless asynchronous link allowing the local wireless network transceiver to operate in a low power mode;
   wherein, upon receiving a dispatch call via the communications transceiver, the baseband processor initiates a high priority dispatch notification to the application processor for causing the local wireless network transceiver to transition to an active mode and commence establishing a wireless synchronous link with the remote audio processor over which audio information is transmitted from the mobile communication device to the remote audio processor.

9. A mobile communication device as defined in claim 8, wherein the baseband processor and application processor are each instantiated on a common hardware computing platform.

10. A mobile communication device as defined in claim 8, wherein the application processor and baseband processor are each instantiated on a different hardware computing platforms.

11. A method for establishing an active wireless communication link between a mobile communication device and a remote audio processor, comprising:
   establishing a long latency link over an air interface between the mobile communication device and the remote audio processor, the long latency link allowing the remote audio processor to operate in a low power mode;
   receiving a dispatch call at the mobile communication device, the dispatch call including audio information from a remote party;
   generating a high priority dispatch notification a baseband processor of the mobile communication device; and
   servicing the high priority dispatch notification by initiating an active link between the mobile communication device and the remote audio processor over the air interface, thereby causing the remote audio processor to transition to an active mode of operation.

12. A method for establishing an active wireless communication link as defined in claim 11, wherein establishing the long latency link comprises establishing an asynchronous link.

13. A method for establishing an active wireless communication link as defined in claim 11, wherein initiating the active link comprises initiating a synchronous link.

14. A method for establishing an active wireless communication link as defined in claim 11, further comprising routing the audio information to the remote audio processor over the active link.

15. A method for establishing an active wireless communication link as defined in claim 11, wherein serving the dispatch interrupt is performed by an application processor.

* * * * *